April 9, 1946.   D. T. HARBISON   2,398,305

VALVE PULLER

Filed Sept. 20, 1945

INVENTOR.
Dixon T. Harbison
BY Jack A. Ehley
Joseph H. Ehley
ATTORNEYS

Patented Apr. 9, 1946

2,398,305

UNITED STATES PATENT OFFICE 2,398,305

VALVE PULLER

Dixon T. Harbison, Fort Worth, Tex.

Application September 20, 1945, Serial No. 617,464

7 Claims. (Cl. 294—86)

This invention relates to new and useful improvements in valve pullers.

It is customary to seat standing valves in wells so that they can be disengaged from their seats and pulled upwardly through the well tubing.

One object of the invention is to provide an improved valve puller which may be attached to the bottom of the traveling valve and lowered therewith into the working barrel of the well pump.

A particular object of the invention is to provide an improved valve puller arranged with a spring-pressed yieldable screw, the head of which is enclosed in a chamber sealed against the flow of fluid therethrough, whereby wear and cutting due to the abrasive effect of a flowing well fluid are eliminated and the life of the puller thus preserved.

Another object of the invention is to provide an improved valve puller having a flow cage or spider at its upper end for the flow of fluid therethrough, a closed chamber therebelow in which a pulling screw is yieldably mounted, and a seal between the upper end of the chamber and the cage, whereby the screw and its spring may be dropped into the chamber and the chamber then sealed to prevent the flow of a well fluid therethrough, thus eliminating the cutting and erosive effect of a sand bearing well fluid.

Still another object of the invention is to provide a valve puller wherein a spring-pressed screw member is slidably confined in a chamber which is sealed at its upper end by a disk welded thereto, whereby leakage at the top of said chamber or flow through said chamber is positively precluded.

A construction designed to carry out the invention will be hereinafter described together with other features of the invention.

Figure 1:
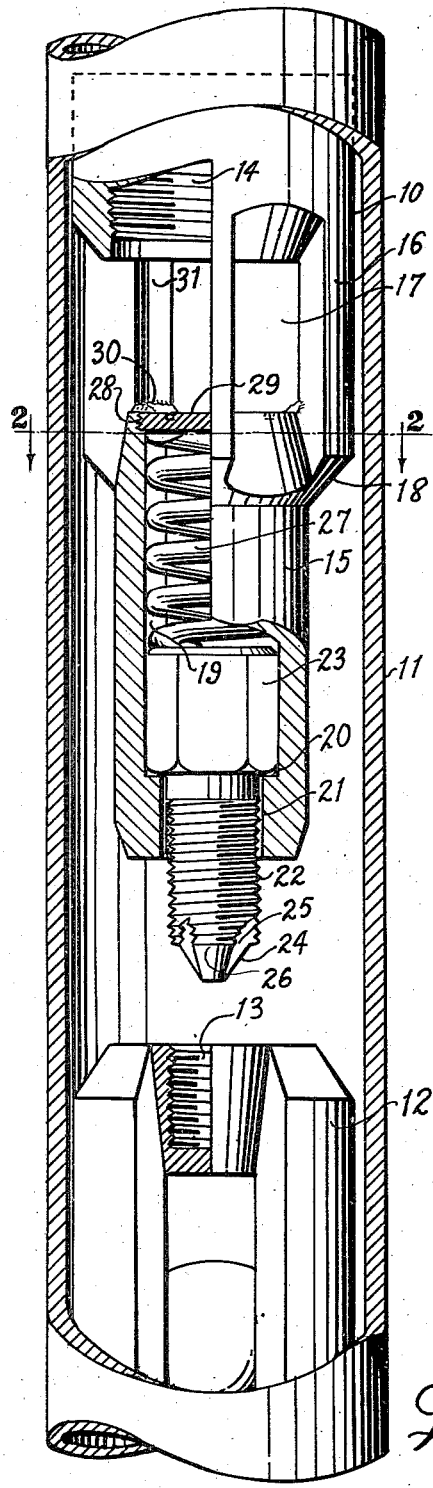
Figure 2:
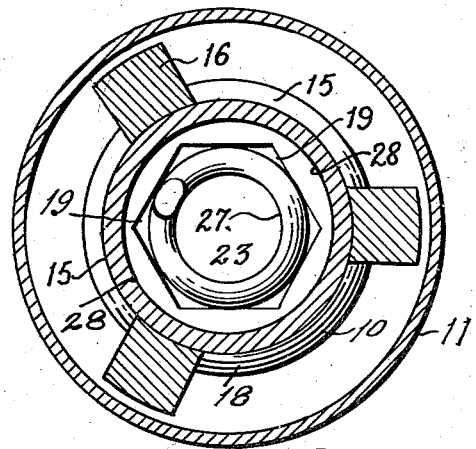
Figure 3:
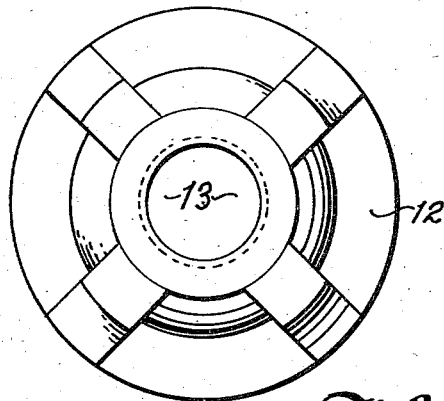

The invention will be more readily understood from a reading of the following specification and by reference to the accompanying drawing, wherein an example of the invention is shown, and wherein:

Fig. 1 is a view of a valve puller constructed in accordance with the invention and a portion of a working barrel, partly in section and partly in elevation, Fig. 2 is a horizontal cross-sectional view taken on the line 2—2 of Fig. 1, and Fig. 3 is a plan view of an ordinary standing valve.

In the drawing, the numeral 10 designates a valve puller body involving the elements of the invention and which is illustrated as disposed in a working barrel 11 above a standing valve 12, which latter has the usual screw-threaded socket 13 in its top. The puller body has an internally screw-threaded annular socket 14 at its upper portion and a cylindrical centrally disposed sleeve 15 at its lower portion.

The sleeve is connected with a socket by a plurality of vertical arms or webs 16 spaced apart to form windows 17 through which fluid may flow or circulate. The elements 16 and 17 constitute a cage or spider. The lower end of the cage is beveled as indicated at 18 and is formed integral with the sleeve 15.

The sleeve is provided with a central bore or chamber 19 formed with an annular shoulder 20 at its lower end, from which a counter bore 21 extends downwardly to the bottom of said sleeve. The bore 19 is made angular in cross-section, preferably being hexagonal in shape. A screw 22 is provided with an elongate hexagonal head 23 which has a free sliding fit in the bore 19; while the depending portion of the screw has a free sliding fit in the counterbore 21. When the head 23 is resting upon the shoulder 20, a substantial portion of the screw depends from the lower end of the sleeve. It will be observed that the screw is cylindrical and has its lower end beveled at 24. Arcuate grooves 25 extend from the beveled end upwardly through the lower threads, whereby the lower end of the screw is formed into a cutting and threading tap 26.

Above the head 23, a coiled spring 27 is confined in the bore 19 with its lower end resting upon said head. The upper end of the bore is provided with a counter-sunk internally screw-threaded recess 28 adapted to receive an externally screw-threaded disk 29 which preferably lies flush with the upper edge of the sleeve. In assembling the puller, the screw is inserted in the bore 19 and dropped so that its head 23 rests upon the shoulder 20. The spring is then placed in the bore and the disk 29 screwed into place, whereby the spring is confined in the sleeve. After the disk has been tightened, it is secured by welds at the intersections of the disk and sleeve with the inner vertical faces 31 of the arms 16, which faces are concaved to facilitate the placing of the disk.

The socket 14 is screwed onto the bottom of the usual traveling valve (not shown), and is reciprocated thereby. The usual stroke of a traveling valve is not sufficient to cause the screw 22 to contact the standing valve 12, but in case it did, the spring 27 would yield and permit the screw to yield upwardly in the bore 23. This is important, because when a standing valve is installed, it is sometimes necessary to use the puller as a hammering tool to force the standing valve down into its seat. When it is desired to pull the standing valve 12, the traveling valve is lowered so as to cause the tap 26 to enter the socket 13. If the socket should be plugged or corroded, the puller can be rotated and the tap will clean out the socket as well as the threads thereof. The puller is rotated sufficiently to engage the screw 22 in the socket 13, whereupon the standing valve may be lifted and withdrawn from the well.

It will be observed that the well fluid which frequently carries sharp sand in suspension, in flowing upwardly from the standing valve, will be induced to pass upwardly between the sleeve 15 and the working barrel 11 and enter the windows 17 in seeking an escape through the socket 14 to the traveling valve. As the disk 29 tightly seals the upper end of the bore 19, it will be impossible for any fluid to circulate through the bores 21 and 19 and thus the head of the screw and the spring will be protected against the abrasive action of such flow. The head 23 resting on the shoulder 20 will form a closure for the lower end of the bore 19 which will tend to exclude the fluid and particularly suspended sand from entering said bore.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve puller including, a socket, an enclosure suspended from the socket and spaced therefrom, there being a flow space between the socket and enclosure, the enclosure having a bore sealed at its upper end, means for sealing the upper end of the enclosure bore, and a screw depending from the socket and having a head yieldably confined in the bore of the enclosure.

2. A valve puller including, an elongate body, a socket at the upper end of the body having a flow space, the body having a chamber provided with imperforate side walls, a screw having a head yieldably confined in the chamber of the body and projecting below said body, and means for sealing the upper end of the chamber of the body to prevent circulation of fluid through said chamber and along said screw.

3. A valve puller including, a socket, a cage suspended from the socket, a sleeve suspended from the cage having a bore, a screw having a head slidably confined in the bore of the sleeve, means for sealing the bore against a circulation of fluid therethrough, and a coiled spring confined in the sleeve bore and bearing against the head of the screw.

4. A valve puller including, a socket, a cage suspended from the socket, a sleeve suspended from the cage having a bore, a screw having a head slidably confined in the bore of the sleeve, means for sealing the upper end of the sleeve bore against a circulation of fluid therethrough, and a coiled spring confined in the sleeve bore between the screw head and the sealing means.

5. A valve puller including, a socket, a cage suspended from the socket, a sleeve suspended from the cage having a bore, a screw having a head slidably confined in the bore of the sleeve, means for sealing the bore against a circulation of fluid therethrough, and a coiled spring confined in the sleeve bore and bearing against the head of the screw, the sleeve bore being angular in cross-section and the screw head being correspondingly shaped, whereby said screw head may be rotated by the sleeve.

6. A valve puller including, a socket, a cage suspended from the socket, a sleeve suspended from the cage having a bore, a screw having a head slidably confined in the bore of the sleeve, a disk fastened in the upper end of the bore to seal the same, and a coiled spring confined in the sleeve bore between the screw head and the disk.

7. A valve puller including, a socket, a cage suspended from the socket, a sleeve suspended from the cage having a bore, a screw having a head slidably confined in the bore of the sleeve, a disk fastened in the upper end of the bore to seal the same, and a coiled spring confined in the sleeve bore between the screw head and the disk, the sleeve bore being hexagonal in cross-section and the screw head being hexagonal to prevent rotation in said bore.

DIXON T. HARBISON.